(12) United States Patent
Anderson

(10) Patent No.: US 6,833,867 B1
(45) Date of Patent: Dec. 21, 2004

(54) METHOD AND SYSTEM FOR EXPANDING THE HARDWARE CAPABILITIES OF A DIGITAL IMAGING DEVICE

(75) Inventor: Eric C. Anderson, San Jose, CA (US)

(73) Assignee: Flashpoint Technology, Inc., San Jose, CA (US)

(*) Notice: Subject to any disclaimer, the term of this patent is extended or adjusted under 35 U.S.C. 154(b) by 0 days.

(21) Appl. No.: 09/063,148

(22) Filed: Apr. 20, 1998

(51) Int. Cl.$^7$ .................................................. H04N 5/76
(52) U.S. Cl. ............................. 348/231.9; 348/231.3
(58) Field of Search ..................... 348/231.1, 231.6, 348/231.7, 231.8, 231.9, 211.99, 207.99, 552, 373, 375, 231.3, 231.99; 358/906; 710/8, 11–14, 100, 301, 302–303, 105; 713/100; 396/57, 429

(56) References Cited

U.S. PATENT DOCUMENTS

| | | | | |
|---|---|---|---|---|
| 4,942,391 A | | 7/1990 | Kikuta | 340/745 |
| 5,278,730 A | | 1/1994 | Kikinis | 361/686 |
| 5,477,264 A | * | 12/1995 | Sarbadhikari et al. | 348/231.6 |
| 5,546,145 A | | 8/1996 | Bernardi et al. | 354/76 |
| 5,633,920 A | | 5/1997 | Kikinis et al. | 379/130 |
| 5,708,840 A | | 1/1998 | Kikinis et al. | 395/800 |
| 5,734,425 A | * | 3/1998 | Takizawa et al. | 348/231.9 |
| 5,754,227 A | * | 5/1998 | Fukuoka | 348/232.6 |
| 5,790,193 A | * | 8/1998 | Ohmori | 348/375 |
| 5,815,205 A | * | 9/1998 | Hashimoto et al. | 348/373 |
| 5,818,029 A | * | 10/1998 | Thomson | 235/486 |
| 6,006,039 A | * | 12/1999 | Steinberg et al. | 396/57 |
| 6,145,046 A | * | 11/2000 | Jones | 710/100 |
| 6,163,816 A | * | 12/2000 | Anderson et al. | 710/8 |
| 6,195,513 B1 | * | 2/2001 | Nihei et al. | 396/429 |
| 6,300,976 B1 | * | 10/2001 | Fukuoka | 348/552 |
| 6,337,712 B1 | * | 1/2002 | Shiota et al. | 348/231.1 |
| 6,360,362 B1 | * | 3/2002 | Fichtner et al. | 713/100 |
| 6,381,662 B1 | * | 4/2002 | Harari et al. | 710/102 |
| 6,385,667 B1 | * | 5/2002 | Estakhri et al. | 710/8 |

* cited by examiner

Primary Examiner—Aung Moe (57) ABSTRACT

A system and method for adding at least one function to a digital imaging device is disclosed. The method and system include accessing a remote memory containing information relating to the at least one function. The at least one function utilizes hardware which is not already supported by the digital imaging device. The method and system further include loading the information relating to the at least one function on the digital imaging device so that the at least one function and the hardware can be used by the digital imaging device.

20 Claims, 11 Drawing Sheets

METHOD AND SYSTEM FOR EXPANDING THE HARDWARE CAPABILITIES OF A DIGITAL IMAGING DEVICE

FIELD OF THE INVENTION

The present invention relates to digital imaging devices including digital cameras, and more particularly to a method and system for expanding the hardware and features of the digital camera.

BACKGROUND OF THE INVENTION

Conventional methods for expanding the hardware available to a portable device, such as a digital camera, employ a docking station or connector. For example, docking stations can be used to charge the batteries of a portable digital imaging device, such as a digital camera. The docking station allows the portable digital imaging device to utilize the power supply of the docking station. Similarly, plugging a portable computer into a docking station may allow the portable computer to utilize a printer coupled with the docking station. A connector is also conventionally used to expand a small connector on a portable device, such as a digital camera, to several larger connectors, such as video in and video out connectors. Thus, such docking stations and connectors typically allow a portable device to be plugged into a stationary device more easily and without utilizing significant additional space. Once plugged into the stationary device, the portable device can utilize the hardware features of the stationary device.

In conventional docking stations and other conventional mechanisms for expanding the hardware features available to a portable device, the hardware features are already supported by the portable device. For example, when a digital camera is plugged into a battery charger, the battery begins recharging without changing the function available to the digital camera. Similarly, a printing feature is typically available in a portable computer without reference to whether the portable computer is coupled with a docking station. Once the physical connection between the portable computer and the printer is established, the portable computer accesses the printer. Using the docking station merely makes the physical connections to the printer easy for the user.

In conventional digital imaging devices, such as digital cameras, there is an additional barrier to using a variety of docking stations or other peripheral devices. Conventional digital imaging devices require a certain amount of memory, both in permanent storage and random access memory ("RAM"), to perform functions such as image capture. Conventional digital imaging devices are also designed to be portable and, therefore, have limited memory. Consequently, the memory of such digital imaging devices should not be unnecessarily cluttered by software required to interface with different docking stations while the digital imaging device is being used to capture images.

Accordingly, what is needed is a system and method for adding functions to a digital imaging device where the functions utilize hardware not already supported by the digital imaging device. The present invention addresses such a need.

SUMMARY OF THE INVENTION

The present invention provides a method and system for adding at least one function to a digital imaging device. The at least one function utilizes hardware which is not already supported by the digital imaging device. The method and system comprise accessing a remote memory containing information relating to the at least one function. The method and system further comprise loading the information relating to the at least one function on the digital imaging device so that the at least one function and the hardware can be used by the digital imaging device.

According to the system and method disclosed herein, the present invention allows the hardware features of a digital imaging device to be expanded.

DETAILED DESCRIPTION OF THE INVENTION

The present invention relates to an improvement in digital imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device, particularly a portable device, which displays images, icons, and/or other items could incorporate the features described hereinbelow and that device would be within the spirit and scope of the present invention. Thus, the present invention is not intended to be limited to the embodiment shown, but is to be accorded the widest scope consistent with the principles and features described herein.

Figure 1:
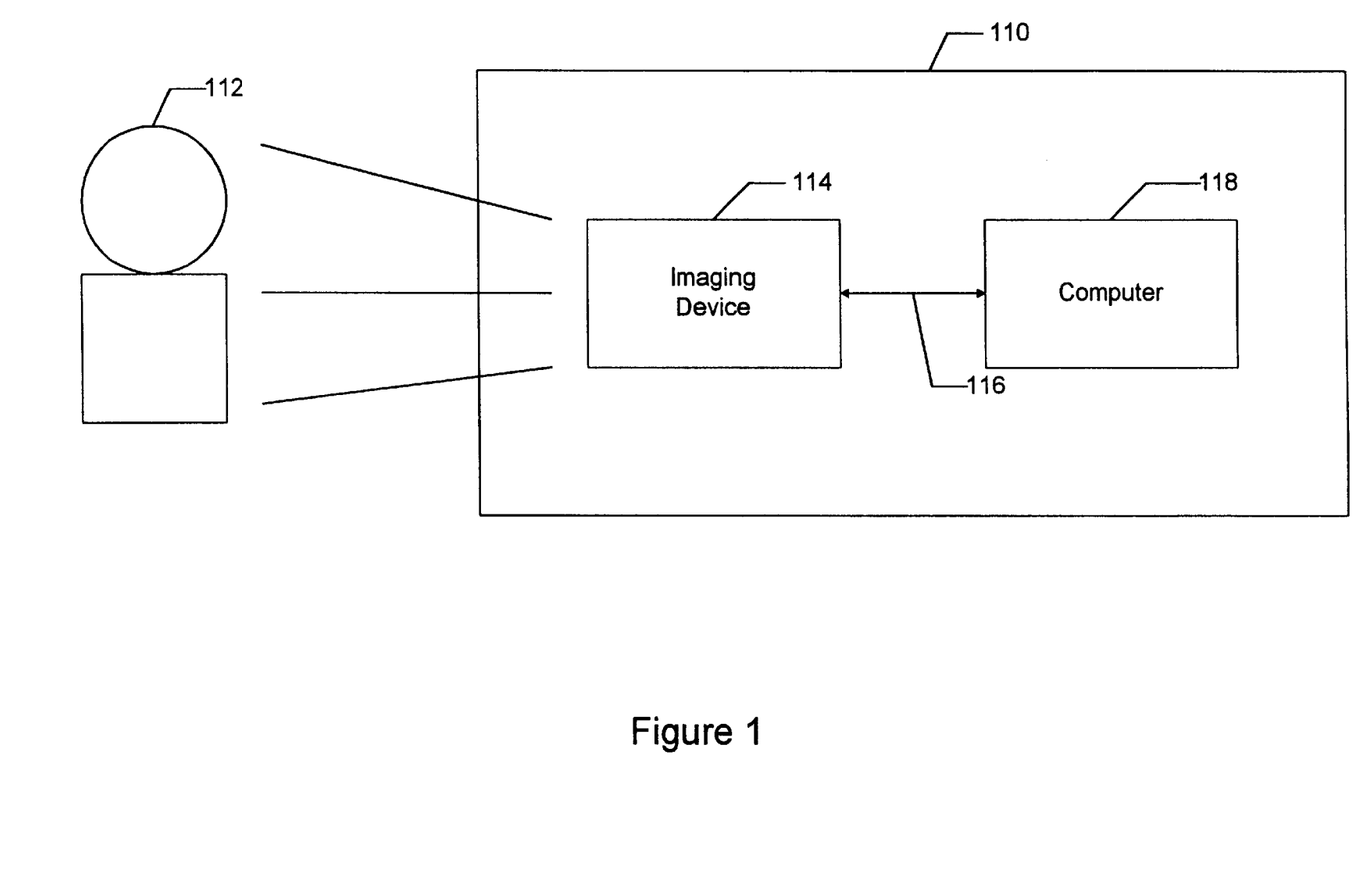
FIG. 1 is a block diagram of a digital camera that operates in accordance with the present invention.

FIG. 1 is a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
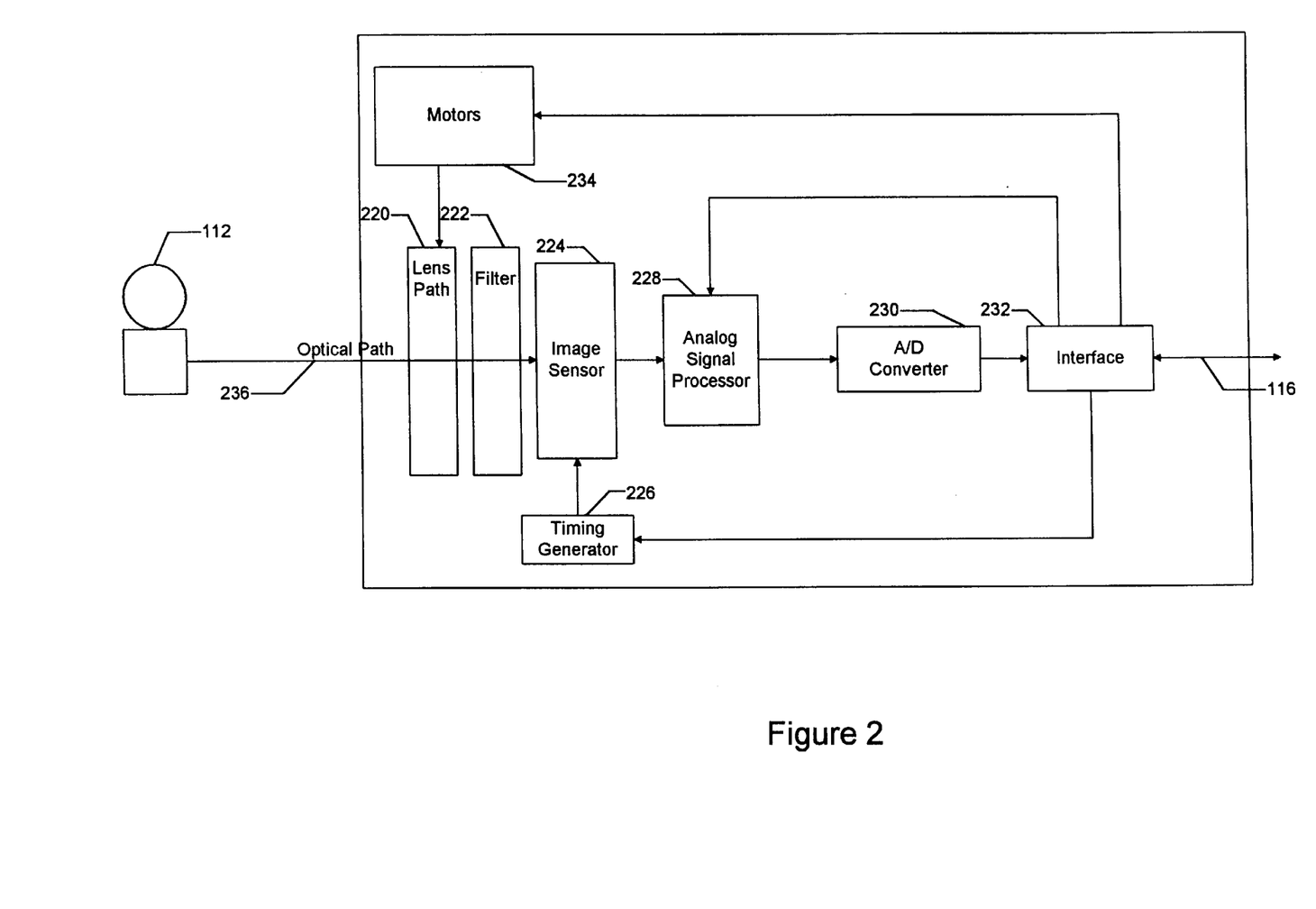
FIG. 2 is a block diagram of one embodiment for the imaging device of FIG. 3.

Referring now to FIG. 2, a block diagram of one embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
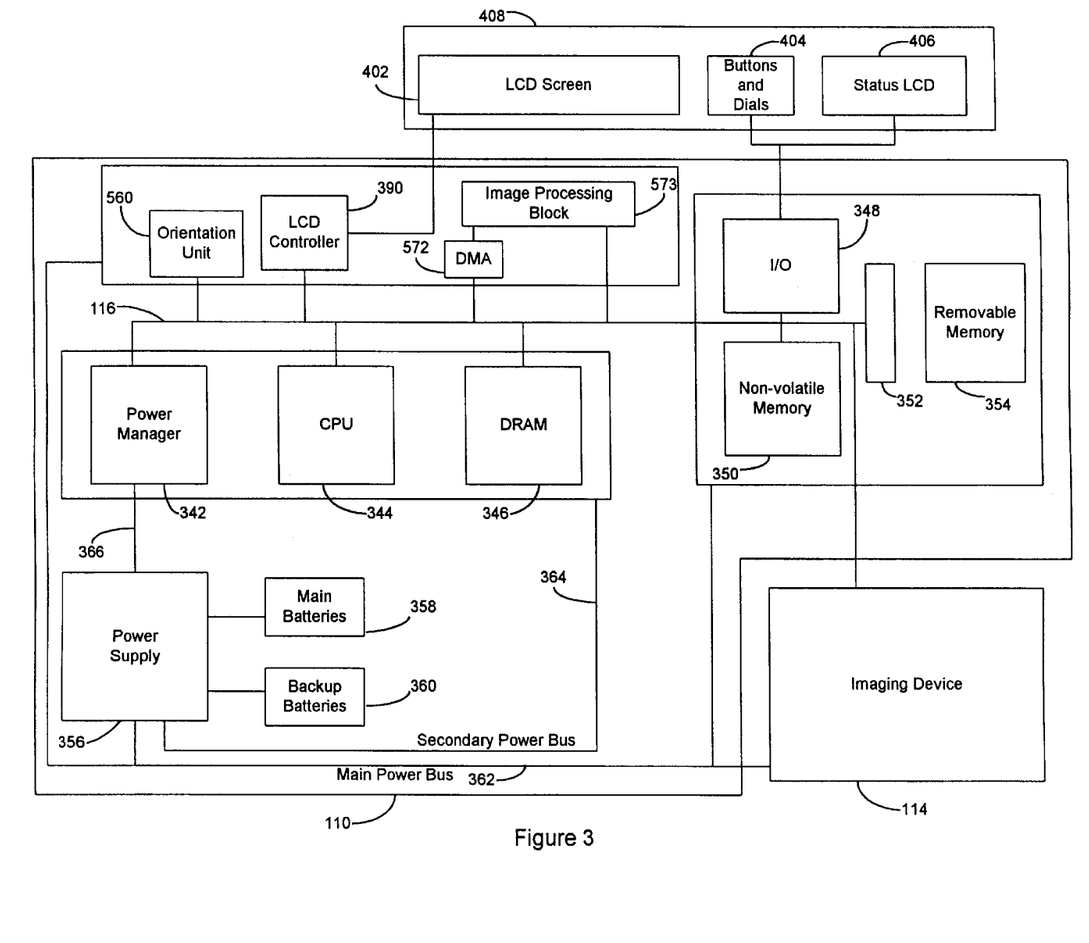
FIG. 3 is a block diagram of one embodiment for the computer of FIG. 2, where image processing is done at least partially in hardware.

Referring now to FIG. 3, a block diagram of one embodiment for computer 118 is shown. In one embodiment, the computer 118 in FIG. 3 provides at least a portion of image processing in hardware using image processing block 573. Thus, in one embodiment the computer 118 has DMA unit 572 for transfers of data to and from the image processing block 573. However, nothing prevents the method and system from being used in a camera 110 which processes image data in software. In such a system, the image processing block 573 would be omitted. In one embodiment, DMA 572 is programmable by the central processing unit (CPU) 344.

System bus 116 provides connection paths between imaging device 114, an optional power manager 342, CPU 344, dynamic random-access memory (DRAM) 346, input/output interface (I/O) 348, non-volatile memory 350, DMA 572, image processing block 573, orientation unit 560, and buffers/connector 352. Removable memory 354 connects to system bus 116 via buffers/connector 352. Alternately, camera 110 may be implemented without removable memory 354 or buffers/connector 352. The orientation unit 560 can sense which position the digital camera 110 is currently in. The orientation unit 560 also sends signals to the CPU 344 indicating the current orientation of the digital camera 110.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In one embodiment, removable memory 354 is implemented using a flash disk. Power supply 356 supplies operating power to the various components of camera 110. In one embodiment, power supply 356 provides operating power to a main power bus 362 and also to a secondary power bus 364. The main power bus 362 provides power to imaging device 114, I/O 348, non-volatile memory 350, LCD controller 390, orientation sensor 560, DMA 572, image processing chain 573, and removable memory 354. The secondary power bus 364 provides power to power manager 342, CPU 344 and DRAM 346.

Power supply 356 is connected to main batteries 358 and also to backup batteries 360. In one embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
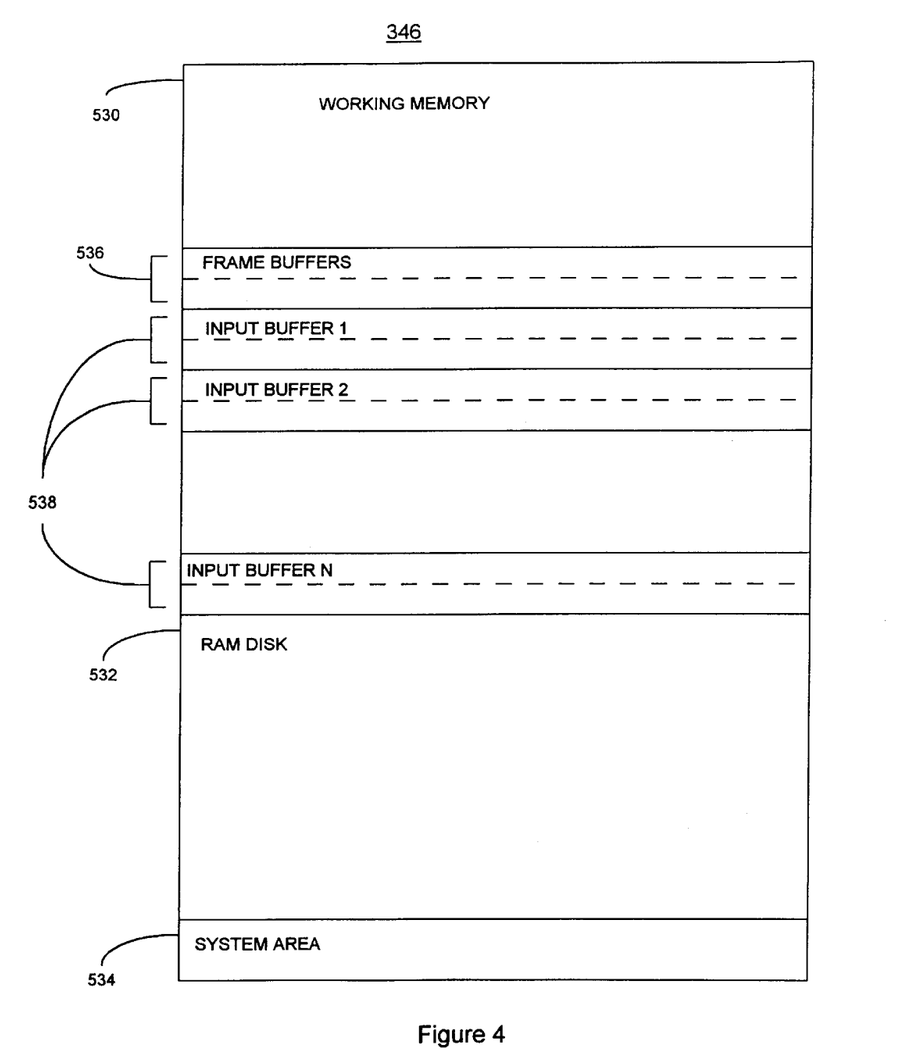
FIG. 4 is a memory map showing one embodiment of the Dynamic Random-Access-Memory (DRAM).

Referring now to FIG. 4, a memory map showing one embodiment of dynamic random-access-memory (DRAM) 346 is shown. In the preferred embodiment, DRAM 346 includes RAM disk 532, a system area 534, and working memory 530.

RAM disk 532 is an optional memory area used for storing raw and compressed image data and typically is organized in a "sectored" format similar to that of conventional hard disk drives. In one embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes several input buffers or one input buffer 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402.

Figure 5:
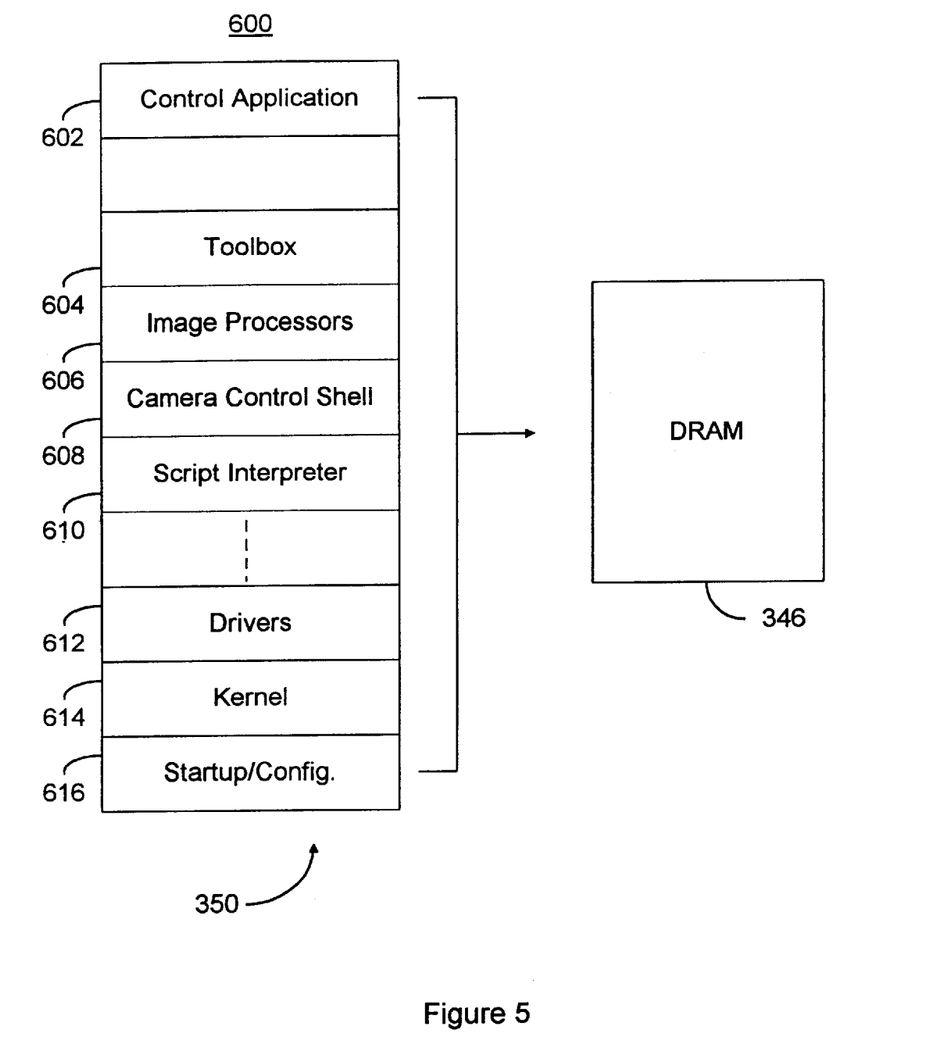
FIG. 5 is a block diagram illustrating the contents of the nonvolatile memory where software is stored and the DRAM where the software is executed.

FIG. 5 is a block diagram illustrating the contents of nonvolatile memory 350 where software 600 is stored and DRAM 346 where the software is executed. The software 600 may include a control application 602, a toolbox 604, drivers 612, a kernel 614, and a startup/configuration module 616. The control application 602 is the main program that controls high-level functions of the digital camera 110 and is responsible for interfacing with functions in the toolbox 604. The toolbox 604 comprises selected function modules that control how the digital camera 110 captures and manipulates images. The modules may include image processors 606, a camera control shell 608, and a script interpreter 610. Image processors 606 are programs for enhancing (e.g., adjusting the contrast, sharpening, converting the image to gray-scale, etc.) the digital image received from the imaging device 114. Camera control shell 608 receives and processes data structures for controlling camera functions. Script interpreter 610 translates and executes script statements, which are used to provide the directed image capture sequences and other camera 110 features. Drivers 612 comprise program instructions for controlling various camera 110 hardware components, such as motor 234 (FIG. 2) and a flash (not shown). Kernel 614 comprises program instructions providing basic underlying camera services including synchronization routines, task creation, activation and deactivation routines, resource management routines, etc. Startup/configuration 616 comprises program instructions for providing initial camera 110 start-up routines such as the system boot routine and system diagnostics.

When the camera 110 is first turned on and booted up, the startup/configuration module 616 begins to execute and loads the drivers 612, the kernel 614, the control application 602, and system files containing configuration information into DRAM 346. Thereafter, operation of the camera 110 is passed to the control application 602.

The present invention provides for a method and system for adding at least one function to a digital imaging device. The at least one function utilizes hardware which is not already supported by the digital imaging device. The method and system comprise accessing a remote memory containing information relating to the at least one function. The method and system further comprise loading the information relating to the at least one function on the digital imaging device so that the at least one function and the hardware can be used by the digital imaging device. As a result, the hardware capabilities of the digital imaging device are expanded. As used herein, expanding the hardware capabilities of a device add to the device a function which uses hardware not previously supported by the device.

The present invention will be described in terms of functions using particular hardware being added to a digital camera. The present invention will also be described in terms of particular physical connectors, configurations, and operating modes. However, one of ordinary skill in the art will readily recognize that this method and system will operate effectively for other types of portable digital imaging devices, other functions utilizing other hardware, other types of physical connectors, other configurations, and other operating modes.

Figure 6:
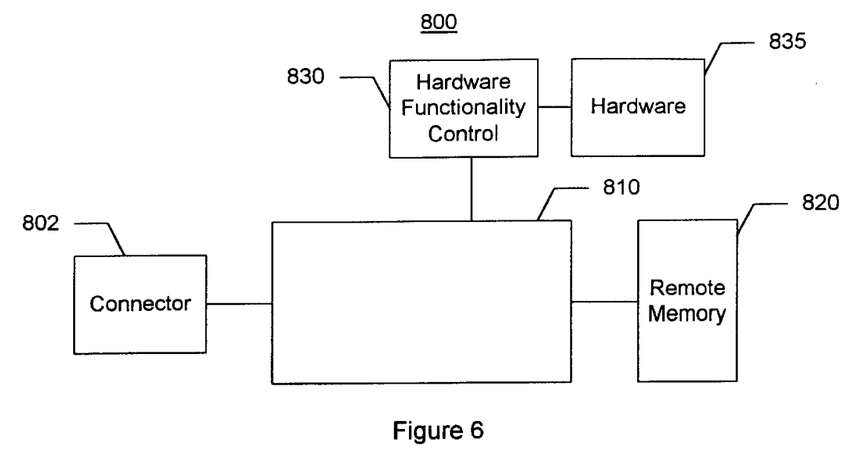
FIG. 6 is a high level block diagram of one embodiment of a system for expanding the hardware capabilities of a digital camera in accordance with the present invention.

To more particularly illustrate the method and system in accordance with the present invention, refer now to FIG. 6. FIG. 6 depicts a high level block diagram of one embodiment of the system 800 used to provide additional hardware capabilities to the digital camera 110 in accordance with the present invention. Thus, the system 800 is used to add to the digital camera 110 functions which use hardware not already supported by the digital camera 110.

The system 800 includes a connector 802 to the digital camera 110. The system 800 may also include a remote memory 820, hardware functionality controls 830, and hardware 835. The hardware 835 may perform any number of functions. Thus, the hardware 835 can include but is not limited to a modem, a printer, a high resolution video display such as a television, or a hard drive. Note that although only one set of hardware 835 is depicted, nothing prevents the system 800 from supporting a other hardware. The remote memory stores information relating to the functions to be added to the digital camera 110. The remote memory 820 may include, but is not limited to, a flash memory, a read only memory ("ROM"), or other memory. The system 800 also includes a mechanism 810 for coupling the digital camera 110 (through the connector 802) with the hardware 835 and remote memory 820. The mechanism 810 includes logic, not shown in FIG. 6. In a preferred embodiment, the mechanism 810 is an ASIC (Application Specific Integrated Circuit).

Figure 7:
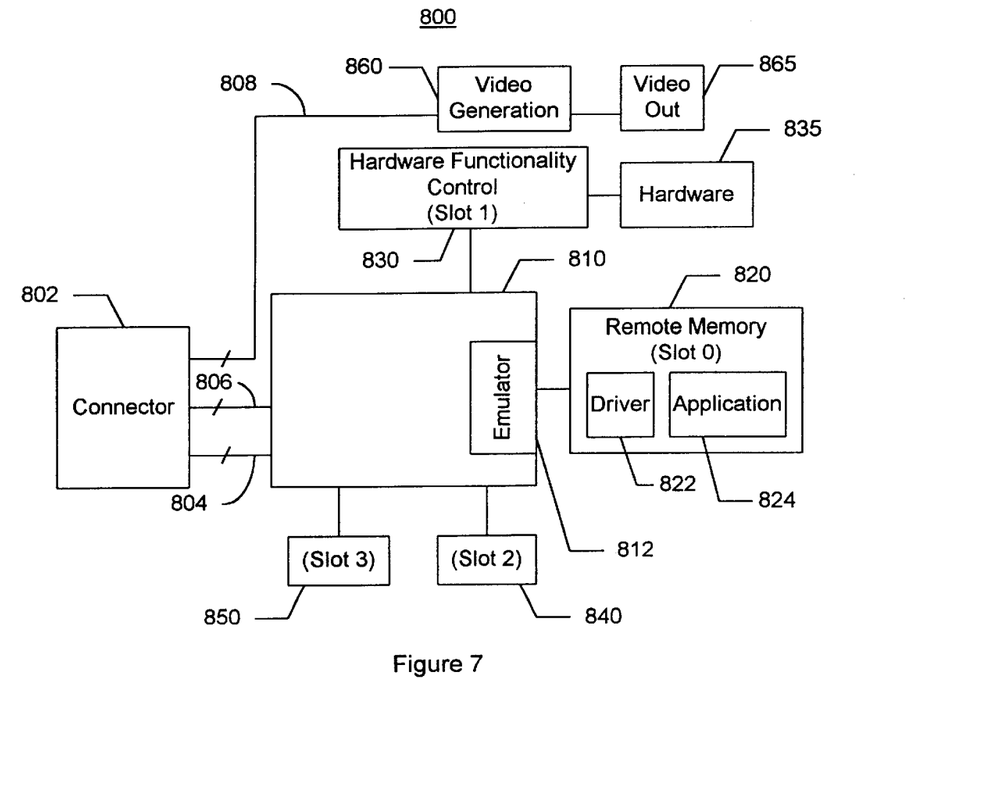
FIG. 7 depicts a more detailed block diagram of one embodiment of a system for expanding the hardware capabilities of a digital camera in accordance with the present invention.

FIG. 7 depicts a more detailed block diagram one embodiment of the system 800 in accordance with the present invention. In the embodiment shown, the connector 802 connects to the digital camera 110 through a receptacle (not shown) in the digital camera 110 for the removable memory 354. In a preferred embodiment, the receptacle in the digital camera 110 for the removable memory 354 is a PCMCIA (Personal Computer Memory Card International Association) slot. Also in an alternate embodiment, the connector 802 is a fifty pin adapter configured in an IDE (Integrated Drive Electronics) mode a compact flash slot. However, nothing prevents the method and system from being used with other configurations.

When the adapter 802 is configured as in the preferred embodiment, twelve pins which are not used for the IDE interface are available for use. In the embodiment shown in FIG. 7, these twelve pins are used for digital video using lines 808 and for "slot" selection via lines 804. In a preferred embodiment, nine pins are used to provide digital video, using lines 808. Thus, nine pins are coupled with a video generation chip 860 and a video output. 865.

Also in a preferred embodiment, three pins are used for slot selection. A slot is a port available for coupling with the digital camera 110 through the ASIC 810. Consequently, a different device could be coupled to each slot. Although depicted as having four slots (elements 820, 830, 840, and 850 connected to slots zero, one, two, and three, respectively), in a preferred embodiment, the ASIC 810 has eight slots available. Eight slots are chosen in one embodiment because three pins, each of which carries a bit in the preferred embodiment, are used for slot selection. Because the digital imaging device normally does not use the three pins that are used for slot selection, some logic (not shown) in the ASIC 810 is capable of reading and decoding three bits on the lines 804 and providing the value of these bits to the system 800. In a preferred embodiment, this additional logic is a three bit latch. Consequently, depending on the combination of bits provided over lines 804, the ASIC 810 will allow communication between the digital camera 110 and devices in different slots.

In the preferred embodiment, the remote memory 820 is located in slot zero of the ASIC 810. The remote memory 820 includes information relating to the functionality provided by the hardware 835. In a preferred embodiment, the remote memory 820 includes software such as an additional driver 822 capable of employing the hardware functionality control 830 and a new application 824 capable of using the additional driver 822. The hardware 835 is depicted as coupled with slot one through the hardware functionality control 830. Slot two 840 and slot three 850 could be used to provide other hardware or other functions. Finally, in a preferred embodiment, the ASIC 810 also includes an emulator 812. The emulator 812 allows communication between the remote memory 820 which may be a flash memory or ROM, and the digital camera 110 which is configured to communicate with a removable memory 354, such as a compact flash card. The emulator 812 emulates the functionality of the removable memory 354, such as a compact flash card IDE controller.

Figure 8:
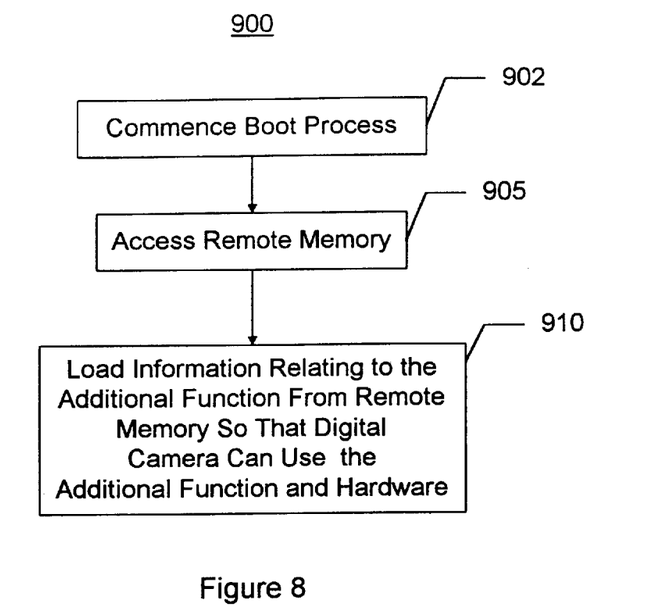
FIG. 8 depicts one embodiment of a method for expanding the hardware capabilities of a digital camera in accordance with the present invention.

FIG. 8 depicts one embodiment of a method for using the system 800 to add to the digital camera 110 a function which uses hardware 835 not already supported by the digital camera 110. In a preferred embodiment, the method 900 commences after the connector 802 is plugged into the digital camera 110 and the user has turned the on digital camera 110. The boot process for the digital camera 110 commences via step 902. Because the digital camera 110 does not normally use the three lines 804, the default slot is preferably set to zero during the commencement of the boot process in step 902. Also in a preferred embodiment, drivers 612 for the digital camera 110 are loaded during step 902.

The remote memory 820 is accessed by the digital camera 110 via step 905. In a preferred embodiment, the remote memory 820 is accessed because during the boot process the digital camera 110 routinely searches for any memory plugged into the digital camera's 110 removable memory receptacle. The remote memory 820 in slot zero is accessed because in a preferred embodiment the default setting of the slot for the ASIC 810 is slot zero. Thus, the ASIC 810 couples the remote memory 820 (slot zero) to the digital camera 110. Information relating to the function to be added to the digital camera is loaded from the remote memory 820 via step 910. In one embodiment, step 910 includes loading the additional driver 822. The loading in step 910 is accomplished so that the digital camera can use the new function and the hardware 835 used by the new function.

Figure 9:
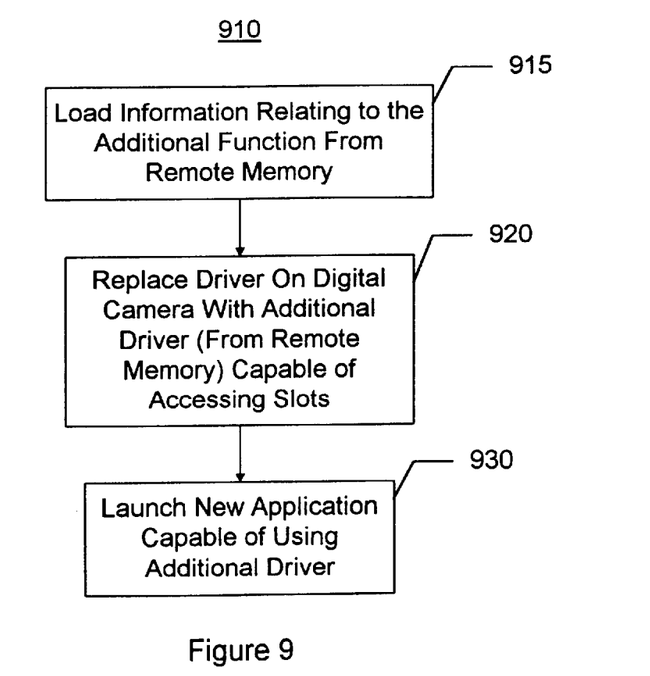
FIG. 9 depicts one embodiment of a method in accordance with the present invention for loading software from a remote memory so that the digital camera can utilize new functions and additional hardware.

Refer now to FIG. 9 which depicts one embodiment of the step 910 of loading the information relating to the additional function to the digital camera 110. This information, new software such as the new application 824 and additional driver 822, is loaded to the digital camera via step 915. At least one of the drivers 612 in the camera's nonvolatile memory 350 is then replaced with the additional driver 822 via step 920. The control application 602 existing in the digital camera is not capable of utilizing all of the functions supported by the additional driver 822. Consequently, the new application 824 is launched via step 930. The new application 824 is capable of using the additional driver 822 to use the function being added and accessing the hardware functionality control 830 and, therefore, the hardware 835.

Figure 10:
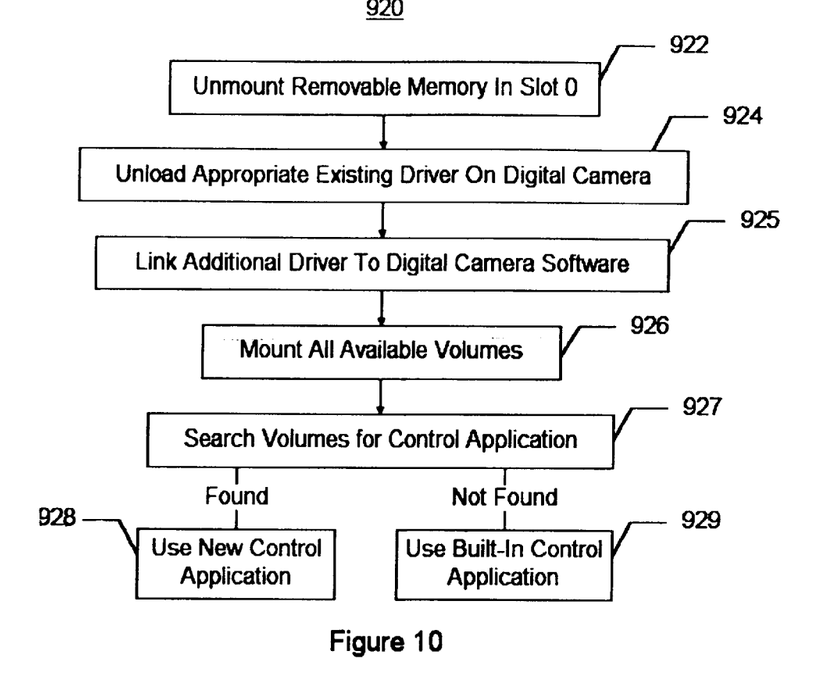
FIG. 10 depicts a method for replacing a driver on the digital camera with a new driver in accordance with the present invention.

FIG. 10 depicts a flow chart of one embodiment of the step 920 of replacing at least one of the drivers 612. The removable memory 820 (the volume in slot zero) is unmounted via step 922. As a result, the driver 612 being replaced is no longer in use. The driver 612 being replaced is then unloaded from the digital camera 110 via step 924. The additional driver 822 is then linked to the software 600 for the digital camera via step 925. As a result, the digital camera 110 can use the additional driver 822.

In a preferred embodiment, once the additional driver 822 is linked to the software 600, the volumes made accessible by the additional driver 822 are mounted via step 926. In addition, the volumes are searched for additional software content via step 927. This search may include the volume in slot zero if a new application resides in the remote memory 820. If a new control application is found in step 927, then the new control application is used via step 928. If, however, a new control application is not found in step 927, then the camera's built in control application 602 is used via step 929.

When the new application 824 is launched via step 930 of FIG. 9, the new functions are provided to the user via the user interface 408 of the digital camera 110. The new application 824 is also aware of the hardware 835 and additional slots two 840 and three 850. Consequently, once the new application 824 is launched, the slot selection can be changed from the default, slot zero, to another slot. The ASIC 8 10 is capable of decoding the bits used for slot selection. Depending upon the combination of bits presented over lines 804 (slot selection code"), the ASIC 810 directs communications to and from the selected slot. Consequently, the functions of any devices residing on any selected slot can be accessed by the digital camera 110.

The system discussed with respect to FIGS. 6–10 uses three pins and lines 804 not typically used in an IDE interface to carry the slot selection code. However, in a preferred embodiment, the additional lines 804 and logic to decode the bits presented on lines 804 are not used. Instead, the slot selection code is piggy-backed on a signal consistent with the interface used by the removable memory 354.

For example, in a device using a PCMCIA card in IDE mode, some registers (not shown) are reserved. A number of bits placed in these reserved registers ("reserved bits") can be used to carry the slot selection code. In a preferred embodiment, three reserved bits are used to carry the slot selection code. Thus, the slot selection code can be provided using a conventional IDE configuration. As a result, in the preferred embodiment, the three pins and lines 804 used to carry the slot selection code in FIGS. 6–7 are not used.

A method and system which use the camera's receptacle (not shown) for removable memory 354 have been disclosed. When the digital camera 110 also includes a connector for a bus, the method and system could utilize a bus rather than the receptacle for the removable memory 354. Similarly, when the digital camera 110 includes another mechanism for communication, such as infrared communication, the system and method could use the other mechanism rather than the receptacle for the removable memory 354.

Figure 11:
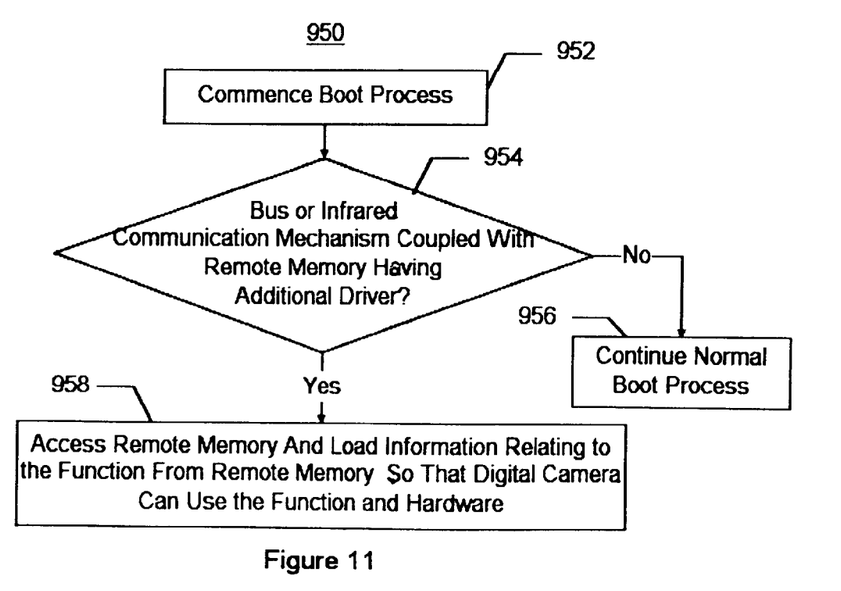
FIG. 11 depicts a method in accordance with the present invention for expanding the hardware capabilities of a digital camera through the use of a bus.

FIG. 11 depicts a method 950 in accordance with the present invention for using a bus to add to the digital camera 110 functions which utilize hardware not previously supported by the digital camera 110. In a preferred embodiment, the method 950 commences after a bus connector (not shown) is plugged into the digital camera. 110 or another mechanism (not shown) for communicating between the digital camera 110 and a docking station is activated and the user has turned on the digital camera 110. The boot process for the digital camera 110 commences via step 952. The bus or other communication mechanism, such as a mechanism allowing infrared communication, is queried via step 954 to determine if the bus or communication mechanism is coupled with a remote memory having information relating to a function to be added. Note that coupling in this context includes the ability to communicate and may not require physical connection. The additional function utilizes hardware not previously supported by the digital camera 110. This information may include software such as a new application 824 and an additional driver 822. If there is no remote memory having the information coupled with bus or communication mechanism, then the normal boot process is continued via step 956. If, however, such a remote memory is coupled with the bus or communication mechanism, then the remote memory is accessed and the information loaded so that the digital camera can use that function and any hardware required by the function.

Figure 12A:
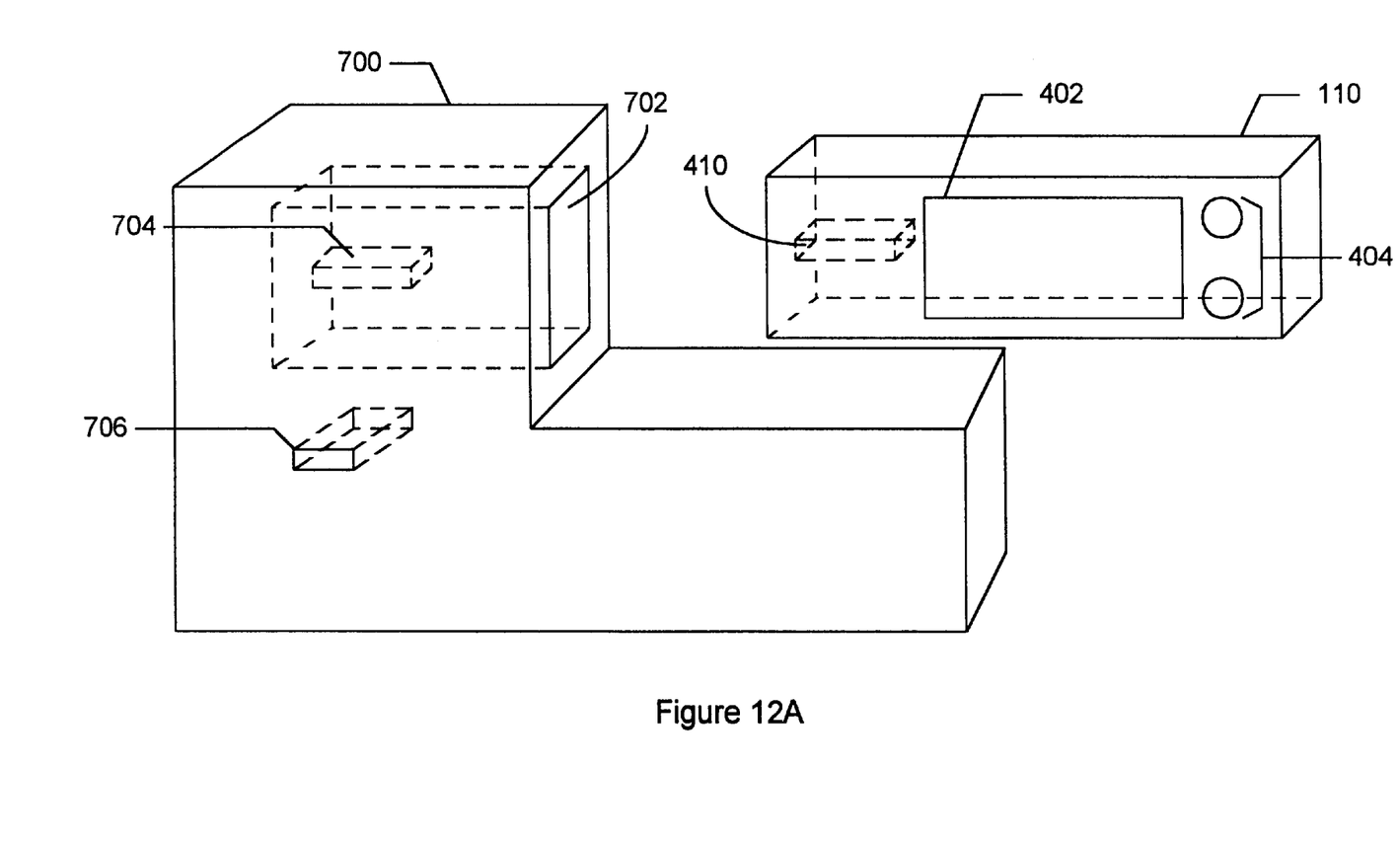
FIG. 12A is a perspective view of one embodiment of a docking station in accordance with the present invention and a digital camera.
Figure 12B:
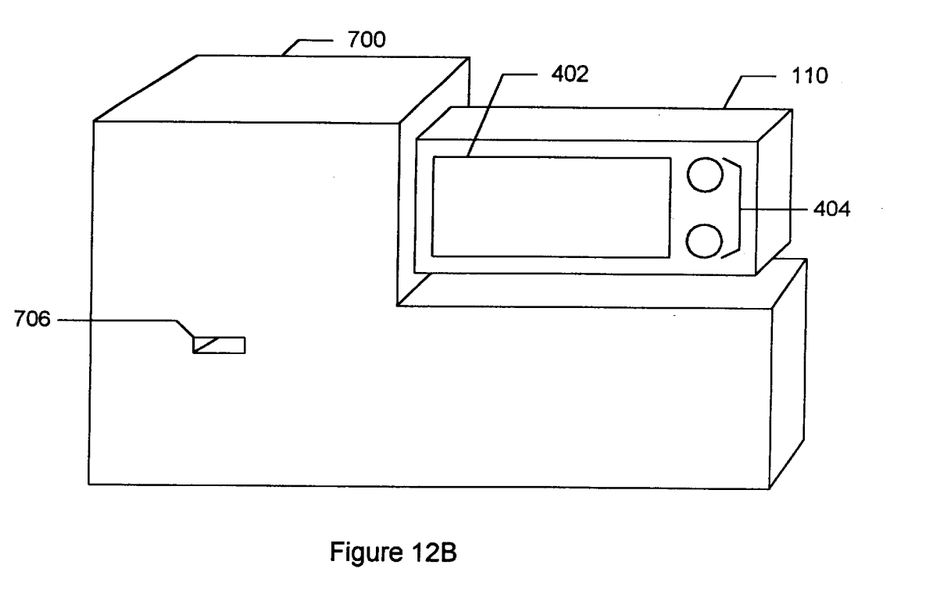
FIG. 12B is a perspective view of the docking station and digital camera when the digital camera is mounted in the docking station.

The system 800, method 900, or method 950 could be used in a number of different configurations. To more particularly illustrate alternate configuration using the method and system in accordance with the present invention, refer now to FIGS. 12A and 12B, FIG. 13, and FIG. 14. FIG. 12A depicts a docking station 700 in accordance with the present invention and the digital camera 110. The docking station 700 includes the system 800 and is used in conjunction with the method 900. The docking station is configured to receive a particular digital camera 110. The docking station 700 includes an aperture 702 into which the digital camera 110 fits. Thus, in one embodiment, the aperture 702 is configured to receive the form factor of digital camera(s) 110 having a particular physical configuration. The aperture 702 includes a connector 704 which connects to the digital camera 110 through a receptacle 410 in the digital camera 110 for the removable memory 354. The docking station 700 also includes a slot 706 configured to receive the removable memory 354. Using the slot 706 allows any files stored on the removable memory 354 to be accessed by the digital camera 110 while the digital camera 110 is in the docking station 700. FIG. 12B depicts the docking station 700 with the digital camera 110. The digital camera 110 is positioned so that connection has been made with the docking station through the connector 704. Note that in this embodiment, the LCD screen 402 of the digital camera 110 is still visible to a user. Similarly, the plurality of buttons and/or dials 404 can be accessed by the user while the digital camera 110 is in the docking station 700.

Figure 13:
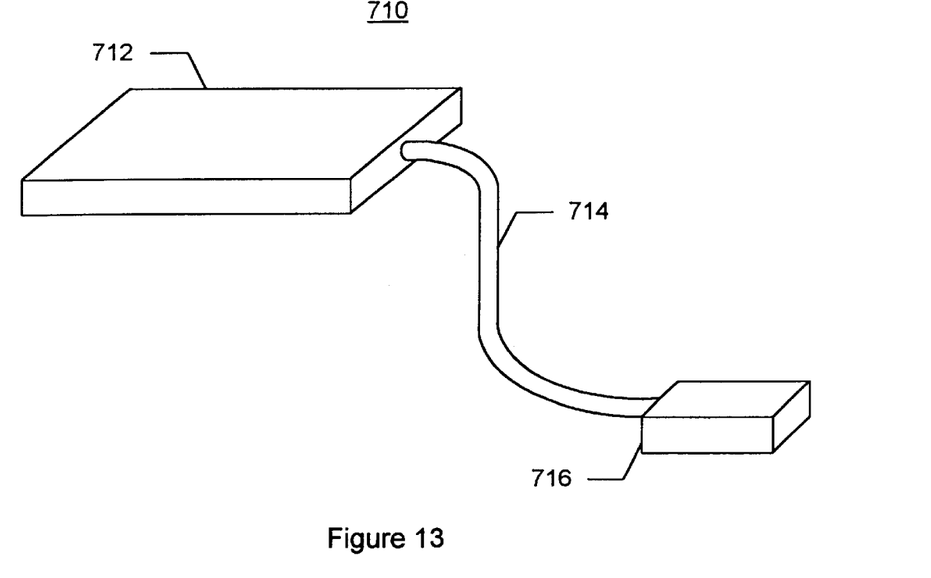
FIG. 13 is a perspective view of one embodiment of a connector in accordance with the present invention for coupling a digital camera with a docking station through the digital camera's removable memory receptacle.

FIG. 13 depicts another embodiment of a system 710 for connecting the digital camera 110 to a docking station (not shown) in accordance with the present invention. The system 710 is a preferred embodiment for providing a connection to the digital camera 110. The system 710 includes portions of the system 800 and is preferably used in conjunction with the method 900. In a preferred embodiment, the system 710 does not require certain hardware such as additional pins in the connector 802 or the lines 804. Thus, in a preferred embodiment, the system 710 piggy-backs the slot selection code on a signal consistent with the interface used by the removable memory 354.

The system 710 includes a connector 712 which is configured to fit into the receptacle 410 in the digital camera 110 for the removable memory 354. Thus, the connector 712 provides a similar function as the connector 704 of FIGS. 12A and 12B. Referring back to FIG. 13, the system 710 also includes a cable 714 which attaches the connector 712 to a second connector 716. The second connector 716 can be attached to a docking station (not shown). Note that the system 710 can be configured so that the cable 714 is connected directly to a docking station (not shown) rather than the second connector 716.

Figure 14:
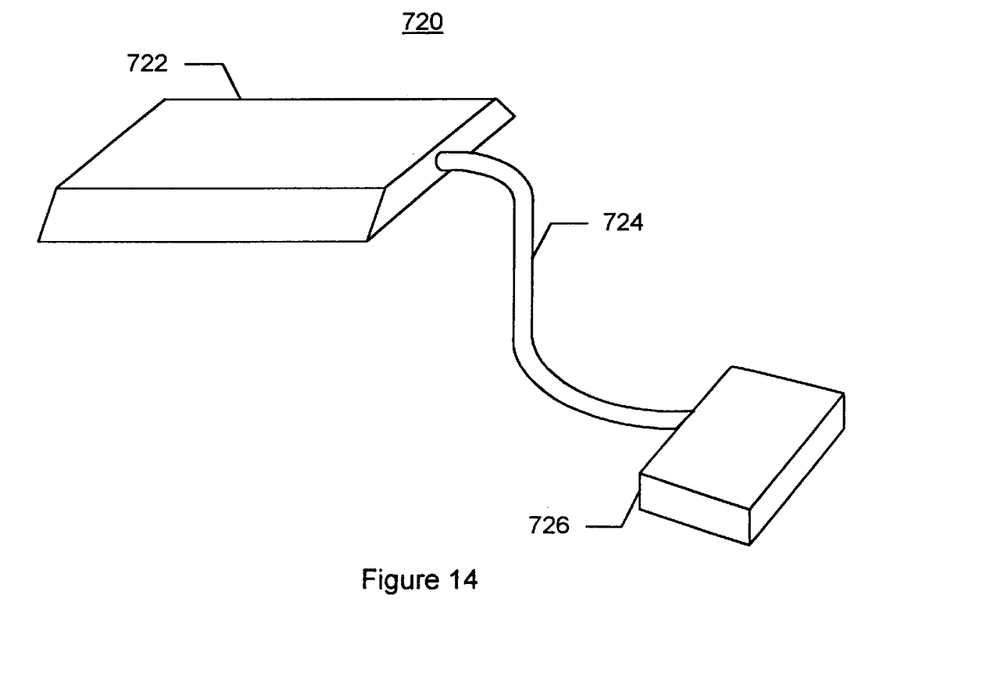
FIG. 14 is a perspective view of one embodiment of a bus connector in accordance with the present invention for coupling to a digital camera through a bus port.

FIG. 14 depicts a bus connector 720 in accordance with the present invention. The bus connector 720 is preferably used in conjunction with the method 950. The bus connector 720 includes a first connector 722 for connecting to a port (not shown) of the digital camera 110. Using the cable 724, the first connector 722 is attached to a second connector 726 which can be attached to a port on another apparatus, such as a docking station. The first connector 722 and second connector 726 may be used to connect to either standard or non-standard ports. Thus, as depicted in FIGS. 12A, 12B, 13, and 14, the system and method in accordance with the present invention can take on many different configurations. In addition, although three embodiments are shown in FIGS. 12A, 12B, 13, and 14, nothing prevents the method and system from being used with alternate embodiments not shown.

A method and system has been disclosed for adding to a digital imaging device functions utilizing hardware not previously supported by the digital imaging device. Thus, the functions and hardware available through the digital imaging device can be changed or expanded depending on the system that is coupled to the digital imaging device. For example, the digital imaging device could be altered in accordance with the present invention to support printing, electronic mail, or archiving when the digital imaging device is coupled with a printer docking station, a modem docking station, or a storage docking station, respectively. Moreover, a combination of these or other functions can be provided when the hardware and information relating to the functions is provided to the digital imaging device. Information relating to the functions is stored in a remote memory. This information is provided to the digital imaging device so that the additional functions and hardware can be used by the digital imaging device.

Each of the docking stations allows a digital imaging device to be compatible with functions using a variety of hardware without consuming a significant amount of memory in the digital imaging device. For example, the present invention is applicable to printing using the digital camera 110. The present invention eliminates the requirement for the digital camera 110 to support a variety of printer drivers on the digital camera 110. At the same time, the digital camera 110 maintains compatibility with printers having a docking station. Similarly the present invention allows the digital camera to maintain compatibility with modems or other devices having docking stations without requiring the digital camera to maintain the drivers for these devices.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for adding at least one function to a digital imaging device, the method comprising the steps of:

(a) accessing a removable memory containing information relating to the at least one function, the at least one function utilizing hardware, the hardware not already supported by the digital imaging device; wherein the accessing step (a) further includes the step of:

(a1) in response to the digital imaging device being booted and the removable memory containing the information being detected, using the digital imaging device to automatically access the removable memory and automatically download the information relating to the least one function, the information relating to the least one function containing at least one additional driver for controlling the hardware; and (b) loading the information relating to the at least one function on the digital imaging device so that the at least one function and the hardware can be used by the digital imaging device.

2. The method of claim 1 wherein the digital imaging device further includes a plurality of drivers, and wherein the loading step (b) further includes the steps of:

(b1) replacing at least one of the plurality of drivers with the at least one additional driver.

3. The method of claim 2 wherein the removable memory further includes a new application capable of controlling the hardware and utilizing the at least on additional driver, and wherein loading step (b) further includes the steps of:

(b2) loading the new application; and (b3) launching the new application.

4. The method of claim 3 wherein the replacing step (b1) further includes the steps of:

(b1i) unloading the at least one of the plurality of drivers; and (b1ii) linking the at least one additional driver so that the at least one additional driver can be utilized by the digital imaging device.

5. The method of claim 4 wherein the digital imaging device further includes a removable memory receptacle, the method further comprising the steps of:

(c) providing a connector configured to utilize the removable memory receptacle to provide a connection between the digital imaging device and the removable memory and between the digital imaging device and the hardware.

6. The method of claim 5 wherein the connector providing step (c) further comprises the steps of:

(c1) providing a docking station including the removable memory, the docking station having a port configured to receive the digital imaging device and to a provide physical connection between the removable memory and the digital imaging device through the removable memory receptacle.

7. The method of claim 6 wherein the at least one function further includes a print function and wherein the hardware includes a printer.

8. The method of claim 7 wherein the at least one function further includes an electronic mail function and wherein the hardware includes a modem.

9. A method for adding at least one function to a digital imaging device having a plurality of drivers, the method comprising the steps of:

(a) providing a connector configured to couple the digital imaging device with a removable memory containing information relating to the at least one function and configured to couple the digital imaging device with hardware utilized by the at least one function, the hardware not already being supported by the digital imaging device, the information including at least one additional driver and a new application, the new application capable of controlling the hardware and utilizing the at least one additional driver;

(b) mounting the removable memory;

(c) loading the information relating to the at least one function on the digital imaging device;

(d) unmounting the removable memory;

(e) unloading at least one of the plurality of drivers;

(f) linking the at least one additional driver so that the at least one additional driver can be utilized by the digital imaging device;

(g) remounting the removable memory; and (h) launching the new application loaded from a docking station so that the at least one function and the hardware can be used by the digital imaging device.

10. A system for adding at least one function to a digital imaging device including a removable memory receptacle, the system comprising:

a removable memory including information relating to the at least one function, the at least one function utilizing hardware, the hardware not already supported by the digital imaging device; and a connector for coupling to the removable memory receptacle;

a mechanism coupled with the connector and the removable memory, the mechanism for providing a connection between the removable memory and the digital imaging device and between the hardware and the digital imaging device, the connection being provided through the removable memory receptacle, the mechanisms further including logic for selecting the removable memory or the hardware to be accessed by the digital imaging device;

wherein the logic is configured to allow the digital imaging device to automatically access the removable memory and automatically download the information relating to the least one function in response to the digital imaging device being booted and the removable memory containing the information being detected, the information relating to the least one function containing at least one additional driver for controlling the hardware.

11. The system of claim 10 wherein the removable memory receptacle is configured to utilize a type of removable memory, and wherein the mechanism further includes:

an emulator for allowing the removable memory to emulate the type of removable memory.

12. The system of claim 11 wherein the mechanism includes an ASIC.

13. The system of claim 12 wherein the removable memory receptacle is a PCMCIA slot and wherein the type of removable memory is configured in IDE mode.

14. A system for adding at least one function to a digital imaging device including a removable memory receptacle, the system comprising:

a connector for coupling to the removable memory receptacle;

a mechanism coupled with the connector for providing a connection between a removable memory containing information relating to the at least one function and the digital imaging device and between the digital imaging device and hardware utilized by the at least one function, the hardware not already being supported by the digital imaging device, the mechanism further including:

logic for selecting the removable memory or the hardware to be accessed by the digital imaging device;

wherein the logic is configured to allow the digital imaging device to automatically access the removable memory and automatically download the information relating to the least one function in response to the digital imaging device being booted and the removable memory containing the information being detected, the information relating to the least one function containing at least one additional driver for controlling the hardware.

15. The system of claim 14 wherein the removable memory receptacle is configured to utilize a type of removable memory, and wherein the mechanism further includes:

an emulator for allowing the removable memory to emulate the type of removable memory.

16. The system of claim 15 wherein the mechanism includes an ASIC.

17. The system of claim 16 wherein the removable memory receptacle is a PCMCIA slot and wherein the type of removable memory is configured in IDE mode.

18. A method for adding at least one function to a digital imaging device, the method comprising the steps of:

(a) accessing a removable memory containing information relating to the at least one function, the at least one function utilizing hardware not already supported by the digital imaging device; wherein the accessing step (a) further includes the step of:

(a1) in response to the digital imaging device being booted and the removable memory containing the information being detected, using the digital imaging device to automatically access the removable memory and automatically download the information relating to the least one function, the information relating to the least one function containing at least one additional driver for controlling the hardware;

(b) loading the information relating to the at least one function on the digital imaging device so that the at least one function and the hardware can be used by the digital imaging device;

(c) mounting the removable memory prior to the accessing step (a); and (d) unmounting the removable memory after the loading step (a).

19. A system for adding at least one function to a digital imaging device including a removable memory receptacle and a plurality of drivers, the system comprising:

a removable memory including information relating to the at least one function, the at least one function utilizing hardware not already supported by the digital imaging device; and a connector for coupling to the removable memory receptacle;

a mechanism coupled with the connector and the removable memory, the mechanism for providing a connection between the removable memory and the digital imaging device and between the hardware and the digital imaging device, the connection being provided through the removable memory receptacle, the mechanisms further including logic for selecting the removable memory or the hardware to be accessed by the digital imaging device and for replacing at least one of the plurality of drivers with at least one additional driver for controlling the hardware;

wherein the logic is configured to allow the digital imaging device to automatically access the removable memory and automatically download the information relating to the least one function in response to the digital imaging device being booted and the removable memory containing the information being detected, the information relating to the least one function containing the at least one additional;

wherein the logic further mounts the removable memory prior to the accessing the removable memory and unmounts the removable memory before replacing at least one of the plurality of drivers with the at least one additional driver.

20. A system for adding at least one function to a digital imaging device including a removable memory receptacle and a plurality of drivers, the system comprising:

a connector for coupling to the removable memory receptacle;

a mechanism coupled with the connector for providing a connection between a removable memory containing information relating to the at least one function and the digital imaging device and between the digital imaging device and hardware utilized by the at least one function, the hardware not already being supported by the digital imaging device, the mechanism further including:

logic for selecting the removable memory or the hardware to be accessed by the digital imaging device and for replacing replaces at least one of the plurality of drivers with at least one additional driver for controlling the hardware;

wherein the logic is configured to allow the digital imaging device to automatically access the removable memory and automatically download the information relating to the least one function in response to the digital imaging device being booted and the removable memory containing the information being detected, the information relating to the least one function containing the at least one additional driver;

wherein the logic further mounts the removable memory prior to the accessing the removable memory and unmounts the removable memory before replacing at least one of the plurality of drivers with the at least one additional driver.

* * * * *